Aug. 17, 1954     S. F. ANDERSON     2,686,363
HAND SCRAPER
Filed Feb. 14, 1952
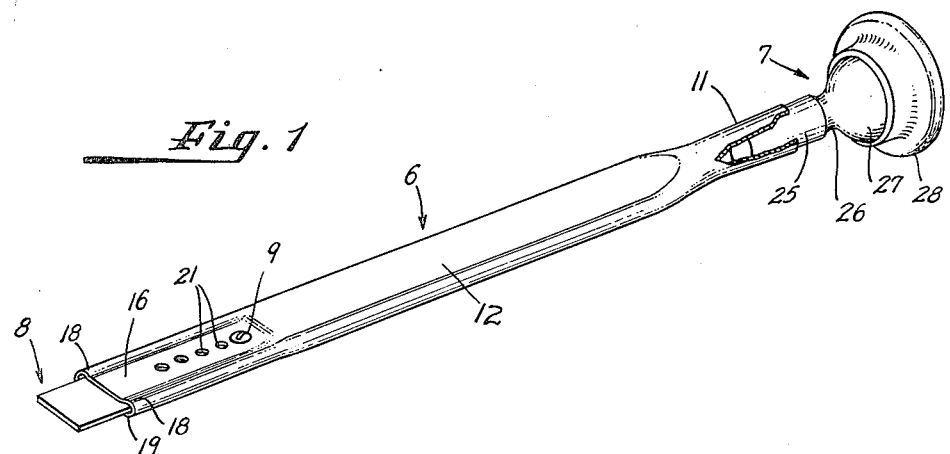
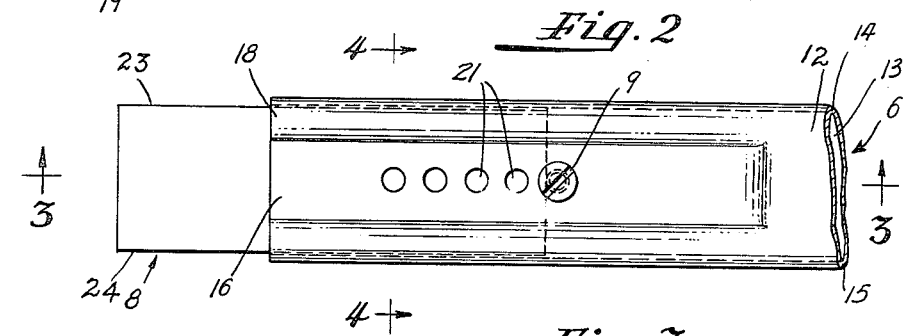
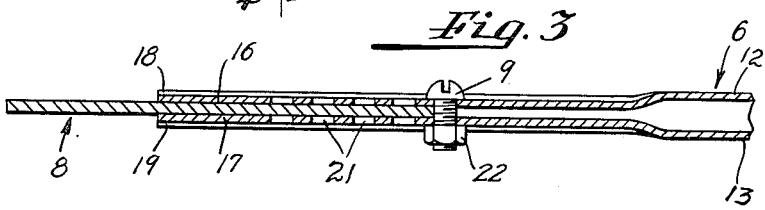
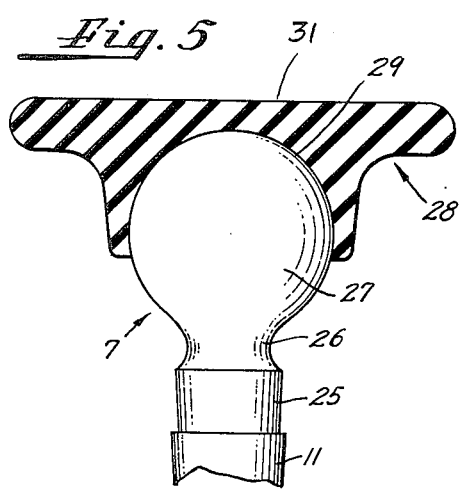
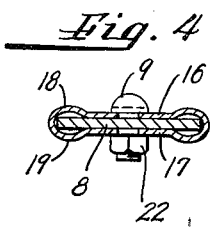
Inventor
Swan F. Anderson
BY McCanna and Morsbach
Attys.

Patented Aug. 17, 1954

2,686,363

UNITED STATES PATENT OFFICE 2,686,363

HAND SCRAPER

Swan F. Anderson, Rockford, Ill., assignor of one-half to Swan F. Anderson and one-half to Ralph F. Anderson, both of Rockford, Ill.

Application February 14, 1952, Serial No. 271,572

5 Claims. (Cl. 30—169)

This invention relates to scraping tools and has special reference to a tool particularly well adapted for hand use primarily in the finishing of metal surfaces.

It is common practice in the metal working arts to employ a scraping tool for the purpose of surfacing metal objects such as castings where the parts must have a close fit, as where two metal parts must be joined without an intermediate gasket. Such tools are also used for producing ornamental effects on metal such as steel. These operations are conducted by highly skilled workmen especially trained for the work and who become very skillful in the handling of scraping tools. Likewise they become highly sensitive to the tools they employ and demand characteristics in the tools which are difficult both to define and to produce. In other words the tools must have a certain "feel" to be acceptable. For many years it has been common practice for the workman to make his own scraping tool (at considerable expense in time, materials and equipment) for the sole reason that in this way he could produce by cut and try experiment, a tool with the proper feel. Few commercial makes of such tools have had such characteristics as to have acquired any substantial degree of acceptance in the field, largely because of the difficulty in developing a tool having the proper combination of rather obscure properties which can be duplicated in manufacture with sufficient uniformity.

An important object of the invention is the provision of a tool of the character described so constructed as to enable commercial manufacture of the tools with substantially uniform properties.

Another object of the invention is the provision of a scraping tool including a body of tubular form having the end portions substantially rigid and an intermediate portion of limited flexibility to provide a desired resiliency in the tool.

A further object of the invention is the provision of a scraping tool including a body of tubular form having a handle mounting portion at one end and an adjacent flattened portion of limited flexibility wherein the handle mounting portion and the handle have a minimum of flexibility.

Another aim of the invention is the provision of a tool of the character described including a tubular body having a flattened central portion to provide limited flexibility in the tool and an open end chuck portion shaped to provide a maximum of rigidity in the body.

Another object of the invention is the provision of a hand scraping tool having improved means for manually applying scraping pressure thereto.

Other objects and advantages will be apparent from the drawings and the description wherein:

Figure 1 is a perspective view of a scraper tool embodying the invention;

Figure 2 is a face view of the chuck end of the tool;

Figure 3 is a section on the line 3—3 of Fig. 2;

Figure 4 is a section on the line 4—4 of Fig. 2; and

Figure 5 is a side view of the handle end of the tool showing the pressure pad in section.

The tool comprises a body 6, a handle 7, a blade 8 and a stop 9, the handle being secured to one end of the body and the blade to the opposite end. The body 6 is of tubular configuration with the ends thereof open and is made from a section of straight metal tubing. At one end the tube is swaged to a taper to enlarge the tube at its extreme end and form a handle attaching portion 11. Beginning at a point adjacent the portion 11 and extending to an area adjacent the opposite end of the body is an intermediate tubular portion having spaced parallel sides 12 and 13 jointed by arcuate edge walls as at 14 and 15. Extending from the intermediate portion to the opposite end of the body is a chuck portion including spaced parallel panels 16 and 17, depressed below the planes of the sides 12 and 13 of lesser width than the sides to provide upstanding marginal walls of arcuate cross section as shown at 18 and 19 which in turn are interconnected by the arcuate edge walls 14 and 15. The panels 16 and 17 are provided with spaced openings as shown at 21 arranged in aligned pairs for the reception of the stop 9 which in this instance is in the form of a bolt passing through a pair of openings and carrying a nut 22.

The blade 8 is in the form of a strip of steel or other metal of suitable properties to perform the contemplated cutting or tooling operations. The blade is flat with its side edges 23 and 24 in substantially parallel relationship as best shown in Fig. 4. The blade is of such thickness as to be snugly received within the body between the panels 16 and 17 with a sliding fit when the nut 22 is loosened. Under these circumstances the corners defining the junction between the side edges 23 and 24 and the opposite faces of the blade contact the arcuate side walls 14 and 15 and the blade is thus guided during the course of any longitudinal movement thereof with the body. However, when the nut 22 is drawn up tight the panels 16 and 17 are drawn together, thus increasing the curvature of the semi-tubular sections formed by the marginal walls 18 and 19 and the edge walls 14 and 15, thus causing the corners to bite in and the blade to be rigidly confined as shown in Fig. 4. It will of course be apparent that the purpose of the additional spaced openings 21 is to permit the distance to which the blade protrudes to be adjusted to suit convenience or wear.

The handle 7 which may conveniently be made of wood is provided with a tapered tang received in the tapered end of the body, a reduced neck 26 and a spherical head 27. In some types of operations the tool will be used in this condition but there is also provided a pad 28 forming part of the handle, the pad being of rubber or other pliable material but of sufficient firmness to be capable of sliding with respect to the surface of the handle. To this end the pad has a socket 29 of spherical shape adapted to extend over somewhat more than half the surface of the ball so as to be retained thereon and so that the ball may rotate within the socket. The pad also has an enlarged flattened surface as indicated at 31.

The surface 31 is adapted to be brought against the body of the user so that the operator may lean against this surface to apply a longitudinal force against the scraper when higher forces are required to effect the necessary operation, the pad rotating with respect to the ball to permit the surface 31 to adjust itself against the user's body. On the other hand, the hands of the operator are applied to the shaft intermediate its end for the purpose of manipulating the tool and determining the location, amount and direction of the lateral force applied to the work. In this manipulation of the tool the properties of the shaft or holder are of importance. It must have the right degree of resilience located in the proper places, the end portions should be substantially rigid and the shaft must present a flat surface parallel to the blade for engagement with the hand of the user in handling the tool.

I claim:

1. A hand scraper tool comprising in combination a tubular shaft having an end portion shaped for attachment to a handle for manipulation of the tool, a chuck portion at the opposite end formed by flattened walls of the tubular shaft disposed in approximately parallel spaced relation interconnected by arcuate edge walls, the flattened side walls having openings in aligned pairs spaced longitudinally of the shaft adjacent said opposite end thereof, a scraper blade disposed between said side walls and projecting from said opposite end of the shaft, a stop selectively receivable in any of said pairs of aligned openings to limit inward movement of the blade, and a handle attached to the first mentioned end of the shaft.

2. A hand scraper tool comprising in combination a tubular shaft having an end portion shaped for attachment to a handle for manipulation of the tool, an intermediate flattened shaft portion providing two side walls disposed in spaced approximately parallel relation and arcuate edge walls interconnecting the side walls, and a chuck portion at the opposite end of said tubular shaft providing two side walls disposed in spaced parallel relation and having openings in aligned pairs spaced longitudinally of the shaft, a scraper blade disposed between said side walls in said chuck portion and projecting from said opposite end of the shaft, a stop selectively receivable in any of said pairs of aligned openings to limit inward movement of the blade, and a handle attached to the first mentioned end of the shaft.

3. A hand scraper comprising in combination a tubular shaft having an end portion forming a socket at one end for the reception of a handle, an intermediate flexible resilient flattened shaft portion providing two side walls disposed in spaced approximately parallel relation and arcuate edge walls, interconnecting the side walls and a rigid chuck portion at the opposite end comprising depressed side panels formed in the side walls spaced for the free reception of a scraper blade and arcuate edge walls interconnecting the panels, said panels having openings in aligned pairs spaced longitudinally of the shaft, a scraper blade in the form of a flat metal strip disposed snugly between said panels and projecting from said opposite end of the shaft, a threaded bolt disposed in one pair of aligned openings serving as a stop for limiting inward movement of said blade and clamping said panels toward one another to retain the blade securely therebetween, and a handle having a tang received in the socket and mounting the handle rigidly on said one end of the shaft.

4. A hand scraper comprising in combination a one piece tubular shaft having a rigid end portion of cylindrical cross section forming a socket at one end for the reception of a handle, an intermediate flattened resilient shaft portion providing two side walls disposed in spaced approximately parallel relation and arcuate edge walls interconnecting the side walls, and a rigid chuck portion at the opposite end comprising depressed side panels formed in the side walls spaced for the free reception of a scraper blade and arcuate edge walls interconnecting the panels, a scraper blade in the form of a flat metal strip disposed between said panels and projecting from said opposite end of the shaft, means for retaining the blade in adjusted position in the chuck, a handle having a tang for reception in the socket and a ball shaped end comprising more than a hemisphere, and a pad of resilient material having a socket shaped to encompass said ball shaped end to a point beyond its maximum diameter to retain the pad on the ball and having an enlarged flattened surface for engagement by the body of the user.

5. A hand scraper comprising an elongated unitary tubular shaft having a rigid end portion shaped for attachment to a handle, an intermediate resilient shaft portion and a rigid chuck portion on the opposite end, said shaft being flattened at said intermediate and chuck portions and providing two side walls disposed in approximately parallel relation and arcuate edge walls interconnecting the side walls and extending along said intermediate and chuck portions, said chuck portion having depressed side panels formed in said side walls of a width less than the width of said side walls and providing upstanding marginal walls of arcuate cross section which are interconnected by said arcuate edge walls, a scraper blade in the form of a flat metal strip snugly disposed between said panels with its edges abutting said edge walls and projecting from said opposite end of said shaft, fastener means extending through said depressed panels for clamping said side panels to the blade and for drawing the edge walls along said chuck portion into firm engagement with the edges of said blade, and a handle attached to the first mentioned end of the shaft.

References Cited in the file of this patent

UNITED STATES PATENTS

| Number | Name | Date |
| --- | --- | --- |
| 406,821 | Cunningham | July 9, 1889 |
| 835,160 | Lutz et al. | Nov. 6, 1906 |
| 1,476,033 | Anderson | Dec. 4, 1923 |
| 1,590,031 | Imhof | June 22, 1926 |
| 1,833,406 | Bratrud | Nov. 24, 1931 |
| 1,887,188 | Ross | Nov. 8, 1932 |
| 2,166,013 | McLindon | July 11, 1939 |
| 2,304,332 | Bodkin | Dec. 8, 1942 |